(12) United States Patent
Meins et al.

(10) Patent No.: US 8,590,682 B2
(45) Date of Patent: *Nov. 26, 2013

(54) TRANSFERRING ELECTRIC ENERGY TO A VEHICLE

(75) Inventors: Jürgen Meins, Braunschweig (DE); Carsten Struve, München (DE)

(73) Assignee: Bombardier Transportation GmbH, Berlin (DE)

( * ) Notice: Subject to any disclaimer, the term of this patent is extended or adjusted under 35 U.S.C. 154(b) by 262 days.

This patent is subject to a terminal disclaimer.

(21) Appl. No.: 13/001,837

(22) PCT Filed: Jul. 2, 2009

(86) PCT No.: PCT/EP2009/004960
§ 371 (c)(1),
(2), (4) Date: Mar. 28, 2011

(87) PCT Pub. No.: WO2010/000494
PCT Pub. Date: Jan. 7, 2010

(65) Prior Publication Data
US 2011/0198176 A1    Aug. 18, 2011

(30) Foreign Application Priority Data
Jul. 4, 2008  (GB) ................................ 0812345.7

(51) Int. Cl.
*B60L 9/00* (2006.01)
(52) U.S. Cl.
USPC .......................................................... 191/10
(58) Field of Classification Search
USPC ................................................ 191/10, 14–19
See application file for complete search history.

(56) References Cited

U.S. PATENT DOCUMENTS

| 2,518,736 A | 8/1950 | Wheeler |
| 3,225,351 A | 12/1965 | Chatelain et al. |

(Continued)

FOREIGN PATENT DOCUMENTS

| DE | 1806977 | 6/1969 |
| DE | 2310812 | 9/1973 |

(Continued)

OTHER PUBLICATIONS

Chen et al., "Inductive Power Transferring in Maglev Using Harmonic Injection Method", IEEE, 2004, pp. 1165-1170.

(Continued)

*Primary Examiner* — Zachary Kuhfuss
(74) *Attorney, Agent, or Firm* — The Webb Law Firm

(57) ABSTRACT

The invention relates to a system for transferring electric energy to a track bound vehicle, in particular to a light rail vehicle, such as a tram, wherein the system comprises an electric conductor arrangement (12) for producing an electromagnetic field and for thereby transferring the energy to the vehicle, the electric conductor arrangement (12) comprises at least one line (1, 2, 3) for carrying one phase of an alternating voltage or current, the line (1, 2, 3) extends along the track, the line (1, 2, 3) is arranged in such a manner that it produces—at each point in time while the alternating electric current is flowing through the line (1, 2, 3)—a row of successive magnetic poles (at sections 5) of an electromagnetic field, wherein the successive magnetic poles have alternating magnetic polarities, the row of successive magnetic poles extends in the travel direction of the vehicle which is defined by the track.

17 Claims, 10 Drawing Sheets

(56) References Cited

U.S. PATENT DOCUMENTS

| | | | |
|---|---|---|---|
| 3,513,338 A | 5/1970 | Poloujadoff | |
| 3,863,574 A | 2/1975 | Thomas | |
| 3,914,562 A | 10/1975 | Bolger | |
| 4,068,152 A | 1/1978 | Nakamura et al. | |
| 4,328,499 A | 5/1982 | Anderson et al. | |
| 4,331,225 A | 5/1982 | Bolger | |
| 4,836,344 A * | 6/1989 | Bolger | 191/10 |
| 5,311,973 A | 5/1994 | Tseng et al. | |
| 5,573,090 A | 11/1996 | Ross | |
| 5,669,470 A | 9/1997 | Ross | |
| 5,708,427 A | 1/1998 | Bush | |
| 5,821,728 A | 10/1998 | Schwind | |
| 5,898,579 A | 4/1999 | Boys et al. | |
| 6,005,304 A | 12/1999 | Seelig | |
| 6,089,362 A | 7/2000 | Takasan et al. | |
| 6,089,512 A | 7/2000 | Ansorge et al. | |
| 6,230,861 B1 | 5/2001 | Cornic | |
| 6,250,442 B1 | 6/2001 | Perraud et al. | |
| 6,286,434 B1 | 9/2001 | Fischperer | |
| 6,382,378 B1 | 5/2002 | Cornic | |
| 6,407,470 B1 | 6/2002 | Seelig | |
| 6,421,600 B1 * | 7/2002 | Ross | 701/117 |
| 6,462,432 B1 | 10/2002 | Seelig et al. | |
| 6,499,701 B1 | 12/2002 | Thornton et al. | |
| 6,502,517 B1 | 1/2003 | Groening et al. | |
| 6,753,666 B2 | 6/2004 | Fischperer | |
| 6,868,073 B1 | 3/2005 | Carrender | |
| 6,879,889 B2 | 4/2005 | Ross | |
| 6,985,107 B2 | 1/2006 | Anson et al. | |
| 7,038,573 B2 | 5/2006 | Bann | |
| 7,084,527 B2 | 8/2006 | Futschek | |
| 7,116,540 B2 | 10/2006 | Green et al. | |
| 7,243,752 B2 | 7/2007 | Green et al. | |
| 7,276,812 B2 | 10/2007 | Uhl | |
| 7,277,675 B2 | 10/2007 | Lohr et al. | |
| 7,298,314 B2 | 11/2007 | Schantz et al. | |
| 7,365,698 B2 | 4/2008 | Dwyer et al. | |
| 7,385,363 B2 | 6/2008 | Schemm | |
| 7,511,250 B2 | 3/2009 | Lindig | |
| 7,518,520 B2 | 4/2009 | Mullins | |
| 7,560,927 B2 | 7/2009 | Maguire et al. | |
| 7,694,632 B2 | 4/2010 | Ellmann et al. | |
| 2003/0105560 A1 | 6/2003 | Sugita et al. | |
| 2003/0200025 A1 | 10/2003 | Ross | |
| 2004/0051628 A1 | 3/2004 | Uhl | |
| 2005/0161300 A1 | 7/2005 | Green | |
| 2005/0178632 A1 | 8/2005 | Ross | |
| 2006/0197939 A1 | 9/2006 | Baiker et al. | |
| 2007/0289476 A1 | 12/2007 | Schemm et al. | |
| 2008/0129246 A1 | 6/2008 | Morita et al. | |
| 2008/0316085 A1 | 12/2008 | Rofougaran et al. | |
| 2008/0316103 A1 | 12/2008 | Rofougaran et al. | |
| 2009/0013899 A1 | 1/2009 | Wolf et al. | |

FOREIGN PATENT DOCUMENTS

| | | |
|---|---|---|
| DE | 3527309 A1 | 2/1987 |
| DE | 3714263 A1 | 10/1988 |
| DE | 4115568 A1 | 2/1993 |
| DE | 4236340 A1 | 5/1994 |
| DE | 4236340 C2 | 5/1994 |
| DE | 4342319 A1 | 6/1995 |
| DE | 4429656 C1 | 4/1996 |
| DE | 4446779 A1 | 6/1996 |
| DE | 19512107 B4 | 10/1996 |
| DE | 19512523 A1 | 10/1996 |
| DE | 19735624 C1 | 12/1998 |
| DE | 19723959 A1 | 1/1999 |
| DE | 19746919 A1 | 5/1999 |
| DE | 19801586 A1 | 7/1999 |
| DE | 19856937 A1 | 6/2000 |
| DE | 20002984 U1 | 8/2000 |
| DE | 19947368 C1 | 5/2001 |
| DE | 10013767 A1 | 10/2001 |
| DE | 10026175 A1 | 7/2002 |
| DE | 10112892 A1 | 10/2002 |
| DE | 10227253 A1 | 10/2003 |
| DE | 20209092 U1 | 11/2003 |
| DE | 10225005 C1 | 12/2003 |
| DE | 10326614 A1 | 12/2004 |
| DE | 10334736 A1 | 2/2005 |
| DE | 10334737 A1 | 2/2005 |
| DE | 10346105 A1 | 4/2005 |
| DE | 10349242 B3 | 4/2005 |
| DE | 102004009896 A1 | 9/2005 |
| DE | 102004012746 A1 | 10/2005 |
| DE | 10216422 B4 | 7/2006 |
| DE | 69929353 T2 | 9/2006 |
| DE | 102006006384 A1 | 9/2006 |
| DE | 102004031580 B4 | 2/2007 |
| DE | 102006049588 A1 | 8/2007 |
| EP | 0187526 A2 | 7/1986 |
| EP | 0187527 A2 | 7/1986 |
| EP | 0289868 A2 | 11/1988 |
| EP | 0608242 B1 | 8/1994 |
| EP | 0640255 B1 | 3/1995 |
| EP | 0681939 B1 | 11/1995 |
| EP | 0761493 A1 | 3/1997 |
| EP | 0666804 B1 | 9/1997 |
| EP | 0818868 B1 | 1/1998 |
| EP | 0962353 A1 | 12/1999 |
| EP | 0979176 B1 | 2/2000 |
| EP | 1011187 A1 | 6/2000 |
| EP | 1043186 A1 | 10/2000 |
| EP | 1043187 A1 | 10/2000 |
| EP | 1050094 B1 | 11/2000 |
| EP | 1095812 A1 | 5/2001 |
| EP | 1582395 A1 | 10/2005 |
| EP | 1610450 A2 | 12/2005 |
| EP | 1744443 A1 | 1/2007 |
| GB | 638143 | 5/1950 |
| GB | 657035 | 9/1951 |
| GB | 657036 | 9/1951 |
| GB | 1280148 | 7/1972 |
| GB | 1390225 | 4/1975 |
| GB | 2236957 A | 4/1991 |
| GB | 2399465 A | 9/2004 |
| GB | 2461577 A | 1/2010 |
| GB | 2463692 A | 3/2010 |
| GB | 2463693 A | 3/2010 |
| JP | 5843104 A | 3/1983 |
| JP | 6376505 U | 5/1988 |
| WO | 9101232 A1 | 2/1991 |
| WO | 9217929 A1 | 10/1992 |
| WO | 9323908 A1 | 11/1993 |
| WO | 9323909 A1 | 11/1993 |
| WO | 9425304 A1 | 11/1994 |
| WO | 9511544 A1 | 4/1995 |
| WO | 9511545 A1 | 4/1995 |
| WO | 9530556 A2 | 11/1995 |
| WO | 9823017 A1 | 5/1998 |
| WO | 9908359 A1 | 2/1999 |
| WO | 0118936 A1 | 3/2001 |
| WO | 0171882 A1 | 9/2001 |
| WO | 0235676 A1 | 5/2002 |
| WO | 03052900 A2 | 6/2003 |
| WO | 03095282 A2 | 11/2003 |
| WO | 2004030975 A2 | 4/2004 |
| WO | 2004105226 A1 | 12/2004 |
| WO | 2007126321 A1 | 11/2007 |
| WO | 2009007666 A1 | 1/2009 |
| WO | 2009127938 A2 | 10/2009 |
| WO | 2010031596 A2 | 3/2010 |
| WO | 2010033584 A2 | 3/2010 |

OTHER PUBLICATIONS

Kazimierczuk et al., "Class-E Amplifier with an Inductive Impedance Inverter", IEEE Transactions on Industrial Electronics, Apr. 1990, pp. 160-166, vol. 37, No. 2.

Green et al., "10 kHz Inductively Coupled Power Transfer—Concept and Control", IEEE Power Electronics and Variable-Speed Drives, Oct. 1994, pp. 694-699, Conference Publication No. 399.

(56) References Cited

OTHER PUBLICATIONS

"Microgrid Powered Electric Vehicles: Wireless Energy Transfer Technology", Energy Transport Technologies, "http://ettek.com/images/TechWeb.pdf", published online by at least Dec. 17, 2007, pp. 1-14.

Sato et al., "A New Meander Type Contactless Power Transmission System—Active Excitation with a Characteristics of Coil Shape", IEEE Transactions on Magnetics, Jul. 1998, pp. 2069-2071, vol. 34, No. 4.

Meins et al., "Contactless High Power Supply", Sixth International Conference on Unconventional Electromechanical and Electrical Systems, Sep. 24-28, 2004, vol. 2, 7 pages.

Covic et al., "A Three-Phase Inductive Power Transfer System for Roadway-Powered Vehicles", IEEE Transactions on Industrial Electronics, Dec. 2007, pp. 3370-3378, vol. 54, No. 6.

\* cited by examiner

TRANSFERRING ELECTRIC ENERGY TO A VEHICLE

BACKGROUND OF THE INVENTION

1. Field of the Invention

The invention relates to a system and a method for transferring electric energy to a vehicle, in particular to a track bound vehicle such as a light rail vehicle (e.g. a tram).

2. Description of the Related Art

In particular track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to transferring electric energy to a vehicle which is not necessarily (but preferably) a track bound vehicle. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

Track bound vehicles, in particular vehicles for public passenger transport, usually comprise a contactor for mechanically and electrically contacting a line conductor along the track, such as an electric rail or an overhead line. At least one propulsion motor on board the vehicles is fed with the electrical power from the external track or line and produces mechanic propulsion energy.

Trams and other local or regional trains are operated usually via overhead lines within cities. However, especially in historic parts of cities, overhead lines are undesirable. On the other hand, conductor rails in the ground or near the ground cause safety problems.

WO 95/30556 A2 describes a road way-powered electric vehicle system. The all-electric vehicle has one or more onboard energy storage elements or devices that can be rapidly charged or energized with energy obtained from an electrical current, such as a network of electromechanical batteries. The energy storage elements may be charged while the vehicle is in operation. The charging occurs through a network of power coupling elements, e.g. coils embedded in the road way. Inductive heating coils are located at passenger loading/unloading zones in order to increase passenger safety.

Placing the coils at selected locations along the length of the roadway has the disadvantage that the energy storage on board the vehicle needs a large storage capacity. In addition, if the vehicle does not reach the next coil in time, the vehicle might run out of energy for propulsion or other purposes. Therefore, at least for some applications, it is preferred to transfer energy to the vehicle continuously along the path of travel, i.e. along the track.

Inductively transferring energy from the track to the vehicle, i.e. producing electromagnetic fields, is subject to restrictions regarding EMC (electromagnetic compatibility). On one hand, electromagnetic fields may interfere with other technical devices. On the other hand, people and animals should not be subjected to electromagnetic fields permanently. At least, the respective limit values for field intensity must be observed.

It is an object of the present invention to provide a system and method for transferring electric energy to a vehicle, in particular to a track bound vehicle, which allows for continuous transfer of electric energy during travel and which facilitates meeting the respective limits for EMC.

According to a basic idea of the present invention energy is transferred from an electric conductor arrangement, which is arranged along the track, to the vehicle travelling on the track without having electric contact between the vehicle and the conductor arrangement. The conductor arrangement carries an alternating current which generates a respective electromagnetic field and the electromagnetic field is used to transfer the electric energy to the vehicle.

Preferably, the conductor arrangement is located in and/or under the track, in particular under the surface of the ground on which the vehicle travels. However, the invention also includes the case that at least a part of the conductor arrangement is located sideways of the track, for example when the track is located in the country side or in a tunnel.

The frequency of the alternating current which flows through the conductor arrangement may be in the range of 5-100 kHz, in particular in the range of 10-30 kHz, preferably about 20 kHz.

The principle of transferring the energy by electromagnetic fields has the advantage that the conductor arrangement can be electrically insulated against contact. For example the wires or lines of the conductor arrangement can be buried in the ground. No pedestrian may unintentionally contact the buried lines. Furthermore, the problem of wear and tear of contactors, which are used to contact standard overhead lines or live rails is solved.

As principally disclosed in WO 95/30556 A2, the vehicle which is travelling on the track may comprise at least one coil and the electromagnetic field generates an electric alternating voltage in the coil which can be used to operate any electric load in the vehicle, such as a propulsion motor, or can be used to charge an energy storage system, such as conventional batteries and/or super caps.

SUMMARY OF THE INVENTION

In particular, the following is proposed: A system for transferring electric energy to a track bound vehicle, in particular to a light rail vehicle, such as a tram, wherein
  the system comprises an electric conductor arrangement for producing an electromagnetic field and for thereby transferring the energy to the vehicle,
  the electric conductor arrangement comprises at least one line for carrying one phase of an alternating current,
  the line extends along the track,
  the line is arranged in such a manner that it produces—at each point in time while the alternating electric current is flowing through the line—a row of successive magnetic poles of an electromagnetic field, wherein the successive magnetic poles have alternating magnetic polarities,
  the row of successive magnetic poles extends in the travel direction of the vehicle which is defined by the track.

Alternatively, the system may be defined by the following features:
  the system comprises an electric conductor arrangement
  the electric conductor arrangement comprises at least one line for carrying one phase of an alternating current,
  the line extends along the track,
  the line comprises a plurality of sections which extend transversely to the travel direction of the vehicle which is defined by the track, the sections of the same line are arranged in a row along the track in such a manner that—at each point in time while an alternating electric current is flowing through the line—the alternating current flows through successive sections in the row alternatingly in opposite directions A corresponding method for transferring energy to the vehicle comprises the following features:

an electromagnetic field is produced by an electric conductor arrangement located along the track thereby transferring the energy to the vehicle, the electromagnetic field is produced by conducting at least the phase current of one phase of an alternating current in a line of the electric conductor arrangement, the phase current is conducted along the track in the line in such a manner that—at each point in time while the phase current is flowing through the line—it flows transversely to the travel direction of the vehicle through a plurality of sections of the line, wherein it flows through a first group of the sections in a first direction and it flows through a second group of the sections in the opposite direction and wherein the sections of the first group and of the second group alternate in the direction of travel.

The electric conductor arrangement comprises at least one of the lines mentioned above. Preferably, it comprises at least two of these lines, wherein each line is adapted to carry one phase of a multi-phase alternating current. In practice, it is preferred that the electric conductor arrangement comprises three lines and that each line is adapted to carry one of the three-phases of a three-phase alternating current. However, it is also possible, that there are more than three-phases carried by a corresponding number of lines. The magnetic poles produced by the lines and/or the sections of the different lines are—at each point in time—in a repeating sequence extending in the travel direction, wherein the repeating sequence corresponds to a sequence of the phases. For example in the case of a three-phase alternating current, having the phases U, V, W, a section carrying phase U is followed by a section carrying phase V which in turn is followed by a section carrying phase W and this sequence of phases U, V, W is repeated several times in the direction of the track, i.e. in the travel direction. An example will be described later with reference to the attached figures.

The at least one line produces—at each point in time while the alternating electric current is flowing through the line—a row of successive magnetic poles of an electromagnetic field, wherein the successive magnetic poles have alternating magnetic polarities. In other words: At a given point in time the alternating current in the line produces—in the direction of travel—a magnetic field having a magnetic field vector which is oriented in a first direction in a first region of the line, followed by a second region of the line where the field vector of the magnetic field is oriented in the opposite direction of the first direction, followed by another region of the line where the magnetic field vector is oriented again in the first direction and so on. However, it is not always the case that the first direction and the direction of the magnetic field vector in the following region of the line are exactly oriented in opposite direction. One reason may be that the line is not arranged exactly in a regular, repeating manner. Another reason may be non-symmetrical influences of other lines of the conductor arrangement. A further reason may be external electromagnetic fields. Also, the vehicle which is travelling on the track will influence the resulting electromagnetic field.

However, the principle of alternating magnetic poles produced by the same line of the conductor arrangement at each point in time has the advantage that the resulting electromagnetic field strength sideways of the conductor arrangement as a very small intensity which decreases rapidly with increasing distance to the conductor arrangement. In other words, the oppositely oriented magnetic fields in the regions of the line are superimposed sideways of the line and compensate each other. Since it is desirable to have very small electromagnetic field strength on both sides of the track, it is preferred that the at least one line of the electric conductor arrangement is located in and/or under the track wherein the sections of the line which extend transversely to travel direction extend in a horizontal plane. In this context, "horizontal" also covers the case that the track may form a bent and is slightly inclined. Correspondingly the respective "horizontal" plane of the line sections may also be inclined slightly. Horizontal is therefore referred to the standard case that the track is extending in a horizontal plane. The same applies to the case that the track is leading upwardly onto a hill or downwardly from the hill. Some percentages of inclination of the track are negligible for the compensation of the magnetic fields sideways of the track.

Since the field intensity sideways of the track is very small, energy can be transferred to the vehicle at high power and EMC limit values (e.g. 5 uT for the sideways magnetic field intensity) can be met easily at the same time.

According to a particularly preferred embodiment, the at least one line of the electric conductor arrangement extends along the track in a serpentine manner, i.e. sections of the line which extend in the direction of travel are followed in each case by a section which extends transversely to the travel direction which in turn is followed again by a section which extends in the direction of travel. In case of a plural-phase system preferably all lines of the conductor arrangement are arranged in this manner. The line may be realized by a cable.

The expression "serpentine" covers lines having a curved configuration and/or having straight sections with sharply bent transition zones to neighbouring sections. Straight sections are preferred, since they produce more homogenous fields.

In particular, the alternating current in the at least one line of the conductor arrangement produces an electromagnetic wave which moves in or opposite to the direction of travel with a velocity proportional to the distance of consecutive magnetic poles of the line and proportional to the frequency of the alternating current. Preferably, at least some of the sections which extend transversely to the travel direction, and preferably all of these sections, extend over a width which is greater than the width of a receiving device of a vehicle on the track for receiving the transferred energy. For example, the width of the sections may be greater than maximum width of the vehicles which may occupy the track.

One advantage of the embodiment is that the alternating current which flows through the sections produces a nearly homogenous intensity of the magnetic field in the region where the receiving device may be located.

A further embodiment of the system or method of the present invention guaranties that the alternating magnetic field intensity is constant over time. To achieve this goal, the at least one line is connected to an AC (alternating current) constant-current source which is adapted to feed the line with an alternating current, the mean value of which is constant (or nearly constant) independently of the power which is transferred from the electric conductor arrangement to the vehicle or to the vehicles on the track.

According to a preferred embodiment of the AC constant-current source, it comprises an electrical arrangement which transforms AC voltage to AC current. This electrical arrangement may comprise—in each line—an input inductivity at an input side of the constant-current source and an output inductivity at an output side of the constant-current source, wherein the input side is connected to a voltage source, wherein the output side is connected to line sections along the track, wherein each line comprises a connection point between the input side and the output side and wherein each connection point is connected to a common same star point via a capacity.

If only one vehicle is powered by the primary side power source (which is feeding the conductor arrangement) at a time, a constant AC voltage can be applied to the track side electric conductor arrangement alternatively. Because of the presence of one vehicle only, any interferences of load distribution are avoided. In this case, the AC current through the conductor arrangement (which is caused by the constant AC voltage supply) depends on the load strength. Therefore, the electrical losses of the primary side electric conductor arrangement are load dependent and the current is not constant, as in the case (described above) of a constant AC current supply.

The energy source (or power source) may be (this also applies to other embodiments of the system) a conventional inverter for producing an AC voltage from a constant DC voltage.

Preferably, the electric conductor arrangement is located under the track, e.g. under ground.

In a preferred embodiment, the lines of the multi-phase conductor arrangement are connected at a star point, i.e. the lines are connected to each other at a connection point which is common to all phases. Such a star point configuration is particularly easy to realize and ensures that the behaviour of the plural phases is symmetric, i.e. that all phases carry the same effective current, although—of course—there is a phase shift between the phases. For example in the case of a three-phase system, the phase shift is 120°, as usual. The alternating current in each phase may be a sinusoidal or nearly sinusoidal current. An additional advantage of a star point connection is that no backward conductor to the power source is required. All connections of the conductor arrangement to the power supply system can be made in the same section of the track.

The at least one line comprises an inductivity which is used to transfer the electric energy to the vehicle or vehicles and further comprises a leakage inductivity which does not contribute to the energy transfer to the vehicle or vehicles, wherein the leakage inductivity is compensated by a capacity located in the same line so that the resulting impedance of the capacity and the leakage inductivity is zero. Such a zero impedance has the advantage that the reactive power of the system is minimized and, therefore, the design of the active power components is minimized as well.

Preferably, at least one line (and preferably all of the lines) of the electric conductor arrangement comprises a plurality of line segments, wherein each line segment extends along a different section of the track and can be switched on and off separately of the other line segments. Each line segment usually comprises a plurality of the sections which extend transversely to the travel direction.

Correspondingly, an embodiment of the method comprises the step that line segments are switched on and off independently of the other line segments, so that vehicles at sections of the track, which are occupied by the vehicle, are provided with energy from the electric conductor arrangement and so that line segments along at least some sections of the track, which are not occupied by a vehicle, are switched off. As a result, losses during the operation of the system are reduced. Furthermore, EMC requirements can be met more easily, since unnecessary electromagnetic fields are avoided.

It is particularly preferred that the sections of the track are shorter than the length of a vehicle on the track in the travel direction and that the system is adapted to operate (and in particular, to switch on) line segments only if a vehicle is occupying the respective section of the track where the line segment is located. Since only line segments under (or in some cases like in tunnels sideways of) the track are switched on, the vehicle shields the environment from the electromagnetic field which is produced by the conductor arrangement. Preferably, only segments are operated which are fully occupied by a vehicle, i.e.—in lengthwise direction along the path of travel—the operated segments do not extend beyond the front of the vehicle and do not extend beyond the end of the vehicle.

The switching process may be controlled using the line segments which are switched off. Preferably, the occupation of a respective section of the track by a vehicle may be detected, in particular by detecting a voltage and/or a current in the line segment which is caused by inductive coupling of the vehicle to the line segment and/or which is caused by electromagnetic fields produced by the vehicle. Correspondingly, a measurement device may be connected to at least one of the line segments. Preferably, a plurality of or all of the line segments is connected to a measurement device and/or to the same measurement device. The measurement device or devices is/are adapted to detect the occupation of the respective section of the track by a vehicle by detecting a voltage and/or a current in the line segment which is caused by inductive coupling of the vehicle to the line segment and/or which is caused by electromagnetic fields produced by the vehicle.

The system may be adapted to switch on a line segment before a receiving device of a vehicle for receiving the transferred energy enters the section of the track where the line segment is located.

For example, the length of the line segments may be dimensioned in such a manner, that at least two of the line segments are covered lengthwise by a vehicle on the track, i.e. the minimum length of a vehicle on the track is twice as long as the length of one line segment (preferably, all line segments have the same length). As a result, the receiving device or receiving devices of the vehicle for receiving the transferred energy may be located in the middle section of the vehicle in lengthwise direction. Furthermore, it is preferred that only line segments are switched on, which are fully covered by a vehicle on the track. On the other hand, the event that a vehicle is entering the region above a particular line segment can be detected (as mentioned above) and this line segment is switched on, as soon as the vehicle enters the region above the next following line segment.

Accordingly, line segments are switched off before the vehicle leaves the region above the line segment. Preferably they are switched off before they are no longer fully covered by the vehicle.

If the conductor arrangement comprises more than one line, detecting the events that the vehicle enters or leaves a particular line segment, can be performed using one of the lines only. However, the other lines can be switched on and off correspondingly, i.e. the conductor arrangement comprises sections, wherein all lines in other sections can be switched on and off together.

Principles and details regarding the reception of energy within the vehicle will be described with reference to the attached figures. However, some features are described in the following: The receiving device of the vehicle may comprise a coil of a conductor or of conductors or it may comprise a plurality of coils. The advantage of plural coils of a plural phase receiving device is that it is easier and means less effort to smooth the fluctuations of the received currents or voltages.

Preferably, the at least one coil is positioned only a few centimetres above the primary side conductor arrangement, because the magnetic coupling between primary and secondary coils will decrease with increasing distance. E.g., the at least one coil is positioned not more than 10 cm above the ground, preferably not more than 5 cm and most preferred 2-3 cm above the ground. In particular, this applies if the conductor arrangement is located under the ground. The line or lines of the conductor arrangement may be located not more than 20 cm below the surface of the ground, preferably not more than 10 cm.

Preferably, the receiving device which receives the transferred energy is movable in vertical direction so that it can be brought in a position closely above ground and it can be lifted into a higher position when the receiving device is not used.

Preferably, the receiving device comprises a plurality of coils which are arranged at different positions in the direction of the travel. For example, the distance between the coils may be equal to the distance of the sections of different phases of the conductor arrangement along the track, wherein these sections are sections which extend transversely to the travel direction. However, it is not necessary to place the different coils of the vehicle at the same distance to each other like the distance of the sections.

BRIEF DESCRIPTION OF THE DRAWINGS

Embodiments and examples of the present invention will now be described with reference to the attached figures. The figures show.

DESCRIPTION OF THE PREFERRED EMBODIMENTS

Figure 1:
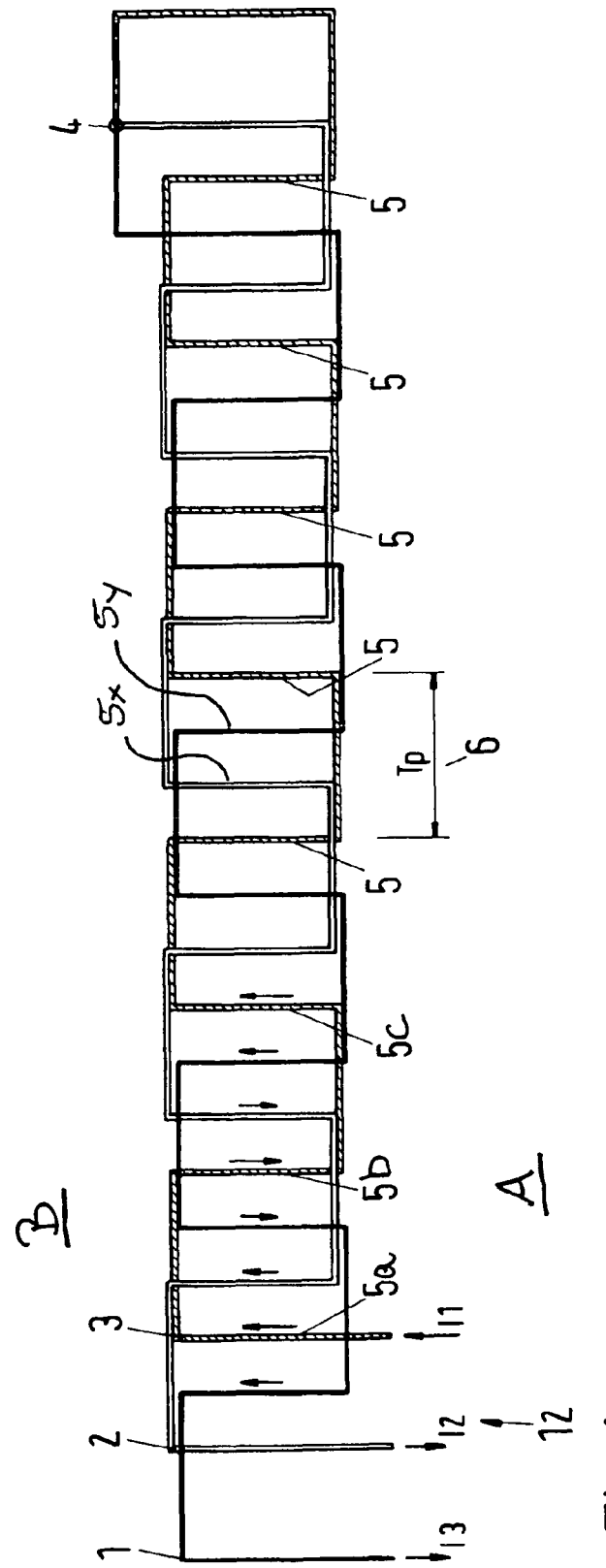
FIG. 1 schematically a three-phase conductor arrangement which extends along a track, FIG. 2 a diagram showing alternating currents through the three-phases of the arrangement according to FIG. 1 as functions of time, FIG. 3 magnetic field lines of a magnetic field, which is produced by the conductor arrangement according to FIG. 1, while a receiving device of a vehicle is located above the shown region of the conductor arrangement, wherein the direction of travel of the magnetic field distribution extends in the plane of the figure from right to left or from left to right, FIG. 4 another diagram showing a region of the magnetic field which is produced by the conductor arrangement, while a load is connected to the receiving device in the vehicle, FIG. 5 a diagram showing schematically the movement of the magnetic wave produced by the conductor arrangement along the track and showing the movement of the receiving device due to the movement of the vehicle on the track, FIG. 6 a schematic circuit diagram of the conductor arrangement according to FIG. 1 which is connected to an AC voltage source via an electrical arrangement which is transforming a voltage of the source into a constant alternating current which is fed into the conductor arrangement, FIG. 7 a circuit diagram showing a receiving device of a vehicle having coils for three different phases, wherein the receiving device is connected to an AC/DC-converter, FIG. 8 a rail vehicle which is travelling on a track along which a conductor arrangement extends, FIG. 9 three consecutive points in time of a situation in which a rail vehicle travels on a track, wherein the track is provided with a plurality of consecutive line segments of a conductor arrangement, wherein the line segments can be switched on and off for providing the vehicle with energy, FIG. 10 an arrangement similar to the arrangement shown in FIG. 8 including a circuit diagram of a conductor arrangement along the track, wherein the conductor arrangement comprises line segments which can be switched on and off, and FIG. 11 an arrangement similar to the arrangement shown in FIG. 1, schematically illustrating a conductor arrangement between two rails of a railway.
Figure 11:
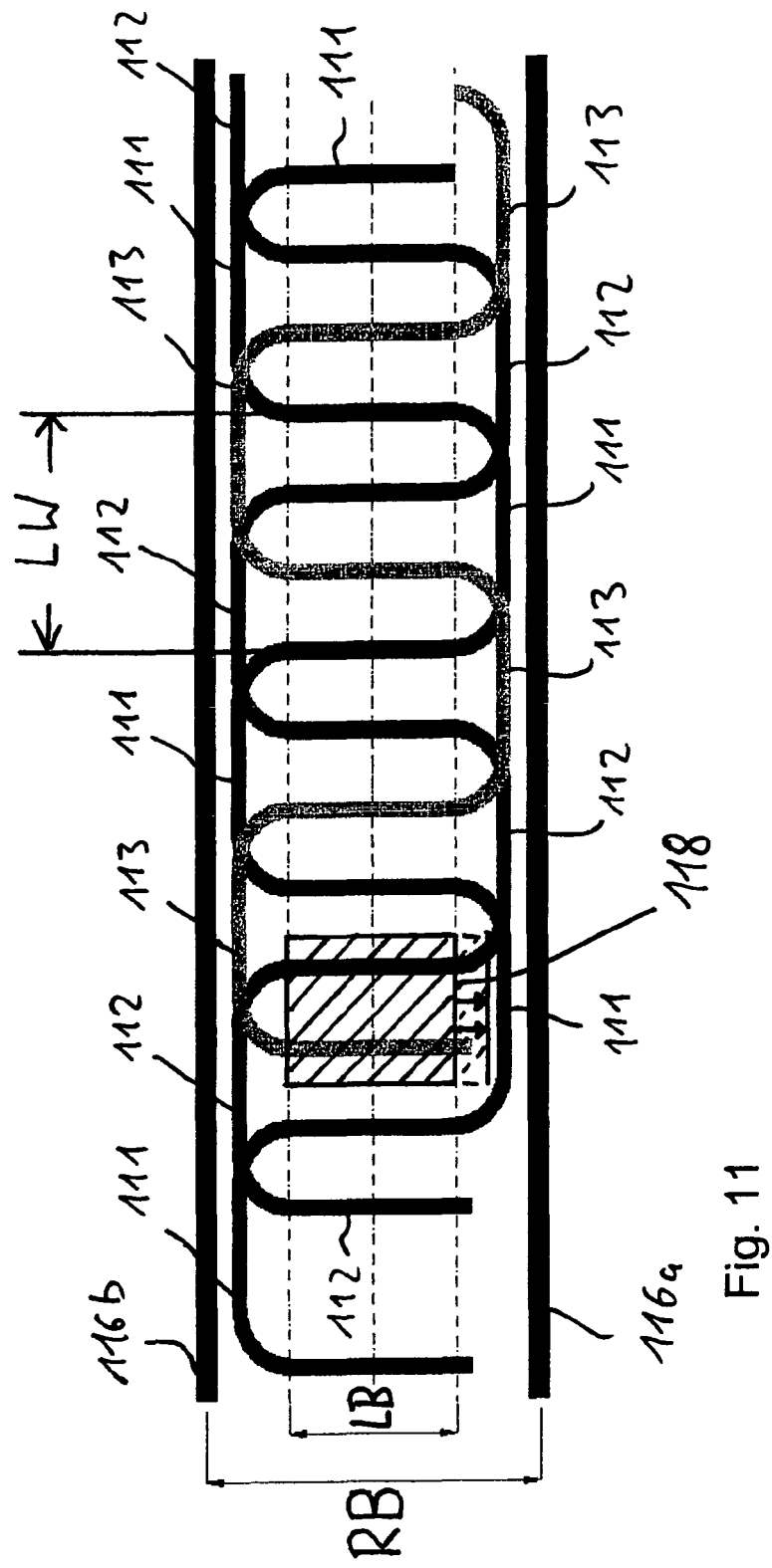

FIG. 1 shows a conductor arrangement which may be located underground along a track, for example along the rails of a railway (see the arrangement shown in FIG. 11, for example). In the latter case, the rails extend from left to right in the view of FIG. 1.

FIG. 1 is understood to be a schematic view. The three lines 1, 2, 3 of the conductor arrangement comprise sections which extend transversely to the direction of travel (from left to right or right to left). Only some of the transversely extending sections of lines 1, 2, 3 are denoted by the reference numerals, namely three sections 5a, 5b and 5c of line 3, some further sections of the line 3 by "5", one section 5x of line 2 and one section 5y of line 1. In the most preferred case, the arrangement 12 shown in FIG. 1 is located underground of the track so that FIG. 1 shows a top view onto the arrangement 12. The rails may extend from left to right, at the top and the bottom in FIG. 1, i.e. the transversely extending line sections may be completely within the boundaries defined by the rails (see also FIG. 11).

Figure 6:
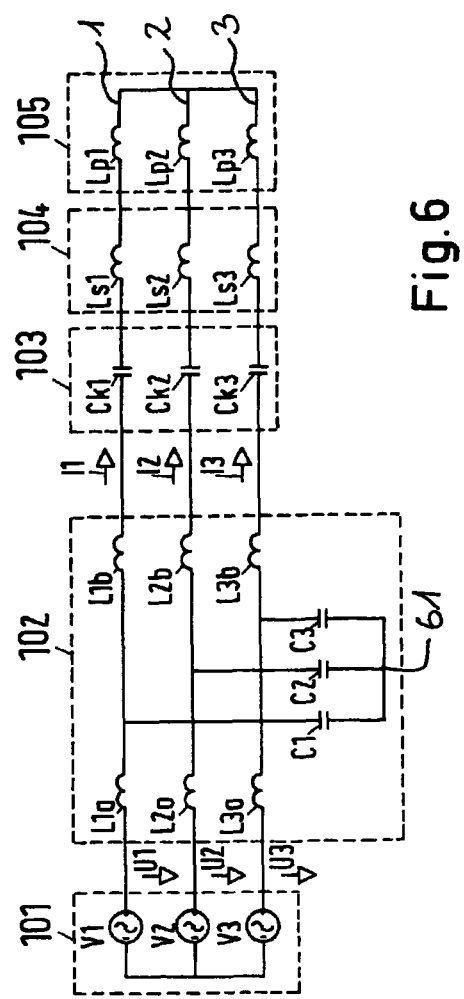

For example, in the manner as shown in FIG. 6, the three lines 1, 2, 3 may be connected to a three-phase AC current source. At the time which is depicted in FIG. 1, a positive current 11 is flowing through line 3. "Positive" means, that the current flows from the current source into the line. The three lines 1, 2, 3 are connected at the other end of the arrangement together at a common star point 4. Consequently, at least one of the other currents, here the current I2 through the line 2 and the current I3 through the line 1, are negative. Generally speaking, the star point rule applies which means that the sum of all currents flowing to and from the star point is zero at each point in time. The directions of the currents through lines 1, 2, 3 are indicated by arrows.

The sections of line 3 and the corresponding sections of lines 1, 2 which extend transversely to the direction of travel preferably have the same width and are parallel to each other. In practice, it is preferred there is no shift in width direction between the transversely extending sections of the three lines. Such a shift is shown in FIG. 1 for the reason that each section or each line can be identified.

Preferably, each line follows the same serpentine-like path along the track, wherein the lines are shifted in the direction of travel by one third of the distance between consecutive sections of the same line extending transversely to the direction of travel. For example, as shown in the middle of FIG. 1, the distance between consecutive sections 5 is denoted by T. Within the region between these consecutive sections 5, there are two other sections which extend transversely to the direction of travel namely, section 5x of line 2 and section 5y of line 1. This pattern of consecutive sections 5, 5x, 5y repeats at regular distances between these sections in the direction of travel.

The corresponding direction of the current which flows through the sections is shown in the left region of FIG. 1. For example, section 5a carries a current from a first side A of the arrangement 12 to the opposite side B of the arrangement. Side A is one side of the track (such as the right hand side in the direction of travel, when viewed from a travelling vehicle) and side B is the opposite side (e.g. the left side of the track), if the arrangement 12 is buried in the ground under the track, or more generally speaking, extends in a horizontal plane.

The consecutive section 5b consequently carries an electric current at the same time which is flowing from side B to side A. The next consecutive section 5c of line 3 is consequently carrying a current from side A to side B. All these currents have the same size, since they are carried by the same line at the same time. In other words: the sections which extend transversely are connected to each other by sections which extend in the direction of travel.

As a result of this serpentine like line arrangement the magnetic fields which are produced by sections 5a, 5b, 5c, ... of the line 3 produce a row of successive magnetic poles of an electromagnetic field, wherein the successive magnetic poles (the poles produced by section 5a, 5b, 5c, ...) have alternating magnetic polarities. For example, the polarity of the magnetic pole which is produced by section 5a may correspond at a specific point in time a magnetic dipole, for which the magnetic north pole is facing upwardly and the magnetic south pole is facing downwardly. At the same time, the magnetic polarity of the magnetic field which is produced by section 5b is oriented at the same time in such a manner that the corresponding magnetic dipole is facing with its south pole upwardly and with its north pole downwardly. The corresponding magnetic dipole of section 5c is oriented in the same manner as for section 5a and so on. The same applies to lines 1 and 2.

However, the present invention also covers the case that there is only one phase, that there are two phases or that there are more than three phases. A conductor arrangement having only one phase may be arranged as line 3 in FIG. 1, but instead of the star point 4, the end of the line 3 (which is located at the right hand side of FIG. 1) may be connected to the energy source (not shown in FIG. 1) by a connector line (not shown in FIG. 1) which extends along the track. A two-phase arrangement may consist of lines 3 and 2, for example, but the distance between the transversely extending sections of the two lines (or more generally speaking: of all lines) is preferably constant (i.e. the distances between a transversely extending section of line 3 to the two nearest transversely extending section of line 2—in the direction of travel and in the opposite direction—are equal).

FIG. 11 is intended to illustrate some dimensions of the conductor arrangement, for example the conductor arrangement shown in FIG. 1. Only parts of the three lines 111, 112, 113 are shown in FIG. 11 and connections to each other (e.g. via the star point 4 of FIG. 1) and to the power supply are omitted.

The serpentine like lines 111, 112, 113 are located between two rails 116a, 116b of a railway for railway vehicles (such as regional or local trains, such as a tram). The expression "between" is related to the top view shown in FIG. 11. For example, the lines 111, 112, 113 may be located below the level of the rails 116.

Each of the lines 111, 112, 113 comprises linear sections which extend transversely to the direction of the track, i.e. the longitudinal direction of the rails 116. These transversely extending sections are connected to the consecutive transversely extending sections of the same line via longitudinally extending sections, which extend in the longitudinal direction of the rails. The transversely and linearly extending sections have a length LB, which is preferably at least as large as half the distance RB between the rails. For example, the distance RB may be 1 m and the length of the transversely extending sections may be 50 cm or in the range of 50 to 75 cm.

The transversely extending sections and the longitudinally extending sections of the same line are connected to each other by curved sections. The curvature corresponds, for example, to the curvature of a circle having a radius of 150 mm.

FIG. 11 also schematically shows a shaded area 118 which is covered by a coil of a receiving device of a vehicle travelling on the rails 116. The width of the coil is equal to the lengths of the transversely extending sections of the lines. However, in practice, it is preferred that this width is smaller than the length of the transversely extending sections. This allows for a shift in the position of the coil in the direction transverse to the travel direction, as indicated by two arrows and a line below the shaded area 118. Such a shift would not influence the reception of energy by the coil, if the shift would not move the coil beyond the boundaries of the transversely extending sections.

As follows from the time dependent diagram shown in FIG. 2, the currents through the phases 1, 2, 3 of FIG. 1 are phase currents of a conventional three-phase alternating current.

Figure 2:
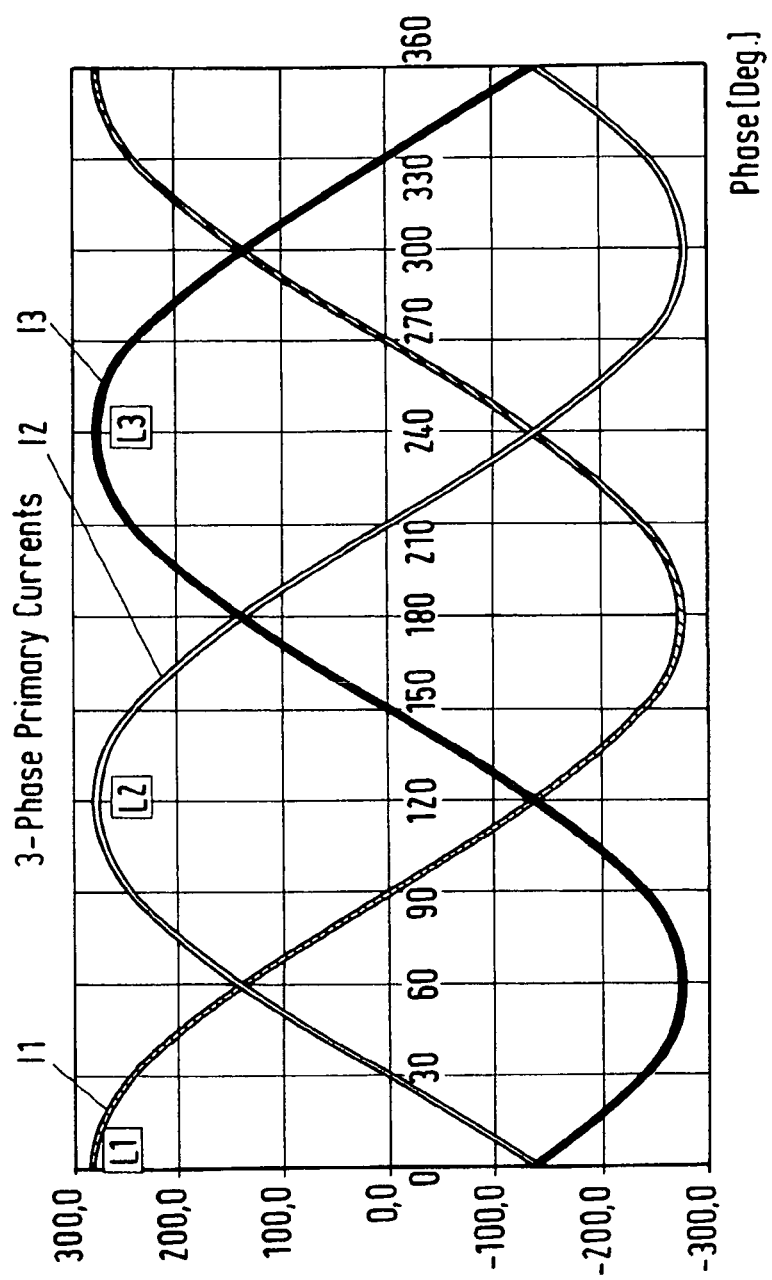

L1, L2, L3 in FIG. 2 denote that the serpentine like lines 1, 2, 3 form inductivities.

As shown in FIG. 2, the peak current value of the currents may be in the range of 300 A respectively −300 A. However, greater or smaller peak currents are also possible. 300 A peak current is sufficient to provide propulsion energy to a tram for moving the tram along a track of some hundred meters to a few kilometres, for example within the historic town centre of a city. In addition, the tram may withdraw energy from an on-board energy storage, such as a conventional electrochemical battery arrangement and/or a super cap arrangement. The energy storage may be charged again fully, as soon as the tram has left the town centre and is connected to an overhead line.

Figure 3:
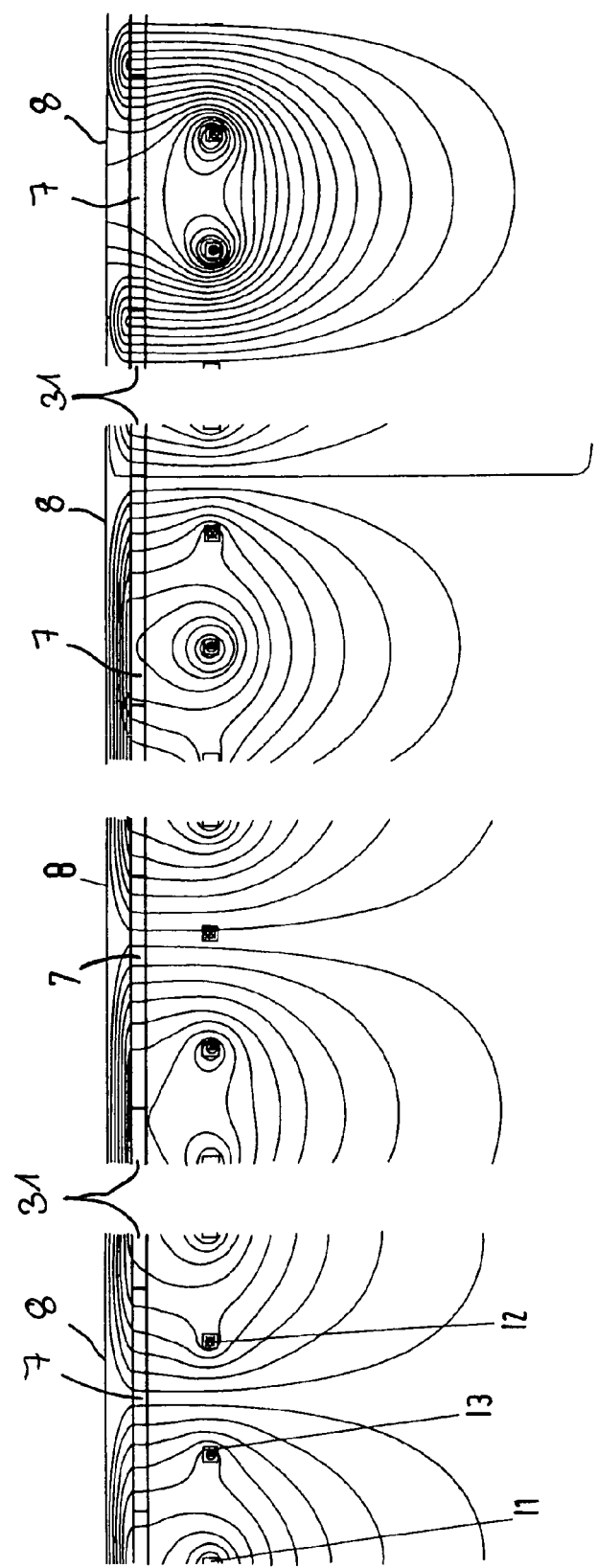

The bent lines in FIG. 3 are field lines of the magnetic field which is produced by the sections of lines 1, 2, 3 shown in FIG. 1. FIG. 3 depicts the situations at four different points in time which correspond to "0", "30", "60", "90" on the time scale of FIG. 2. The time scale of FIG. 2 can also be interpreted as a scale showing the angle of the sinusoidal behaviour of the currents, which means that FIG. 2 shows the behaviour of the currents over one full period, i.e. the current values at the beginning of the period at "0" are the same as at the end of the period at "360".

In the left of the four partial diagrams of FIG. 3, cross sections of transversely extending sections of lines 1, 2, 3 are shown. Reference sign "I1" denotes the current I1 which is flowing through a transversely extending section of line 1 and so on. These transversely extending sections extend perpendicularly to the image plane of FIG. 3, wherein the image plane is a vertical cut plane through the arrangement 12 of FIG. 1, wherein the image planes of FIG. 1 and FIG. 3 are perpendicular to each other and wherein the image plane of FIG. 3 extends in the direction of travel, cutting the sections 5 of FIG. 1 in two halves. In the upper regions of FIG. 3, electromagnetic coils 7 are schematically shown as flat rectangularly framed areas. On top of these coils 7, which are parts of a receiving device of a vehicle for receiving the energy from the arrangement 12, ferromagnetic backbones 8 are located in order to bundle and divert the magnetic field lines. These backbones 8 have the functions of a core of an electromagnet.

Figure 4:
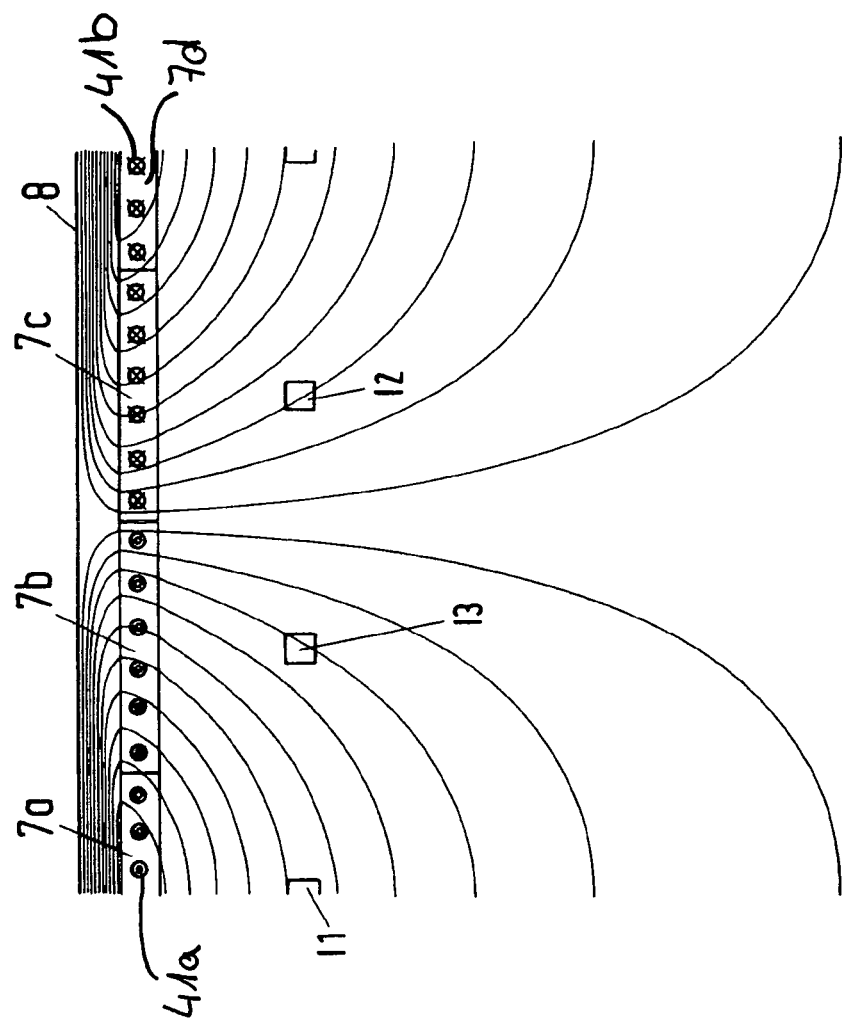

FIG. 4 shows a similar view as the views shown in FIG. 3. However, the figure is meant to illustrate the hypothetical situation that coils in the vehicle (which is travelling on the track) induce current in the conductor arrangement of the track. In addition to FIG. 3, FIG. 4 also shows cross sections through electric conductors 41a, 41b in the regions 7a, 7b, 7c, 7d of the coil 7. In region 7a, 7b, a current which is oriented upwardly out of the image plane of FIG. 4 is flowing at the depicted point in time. On the right hand side of FIG. 4, where regions 7c, 7d of coil 7 are shown, the current is directed downwardly into the image plane of FIG. 4, as indicated by crossed lines. The electromagnetic field (illustrated by the field lines in FIG. 4) which is produced by the coil 7, is symmetric to the border line of sections 7b and 7d, since the amounts of the currents in sections 7a to 7d are also symmetric to the border line.

Figure 5:
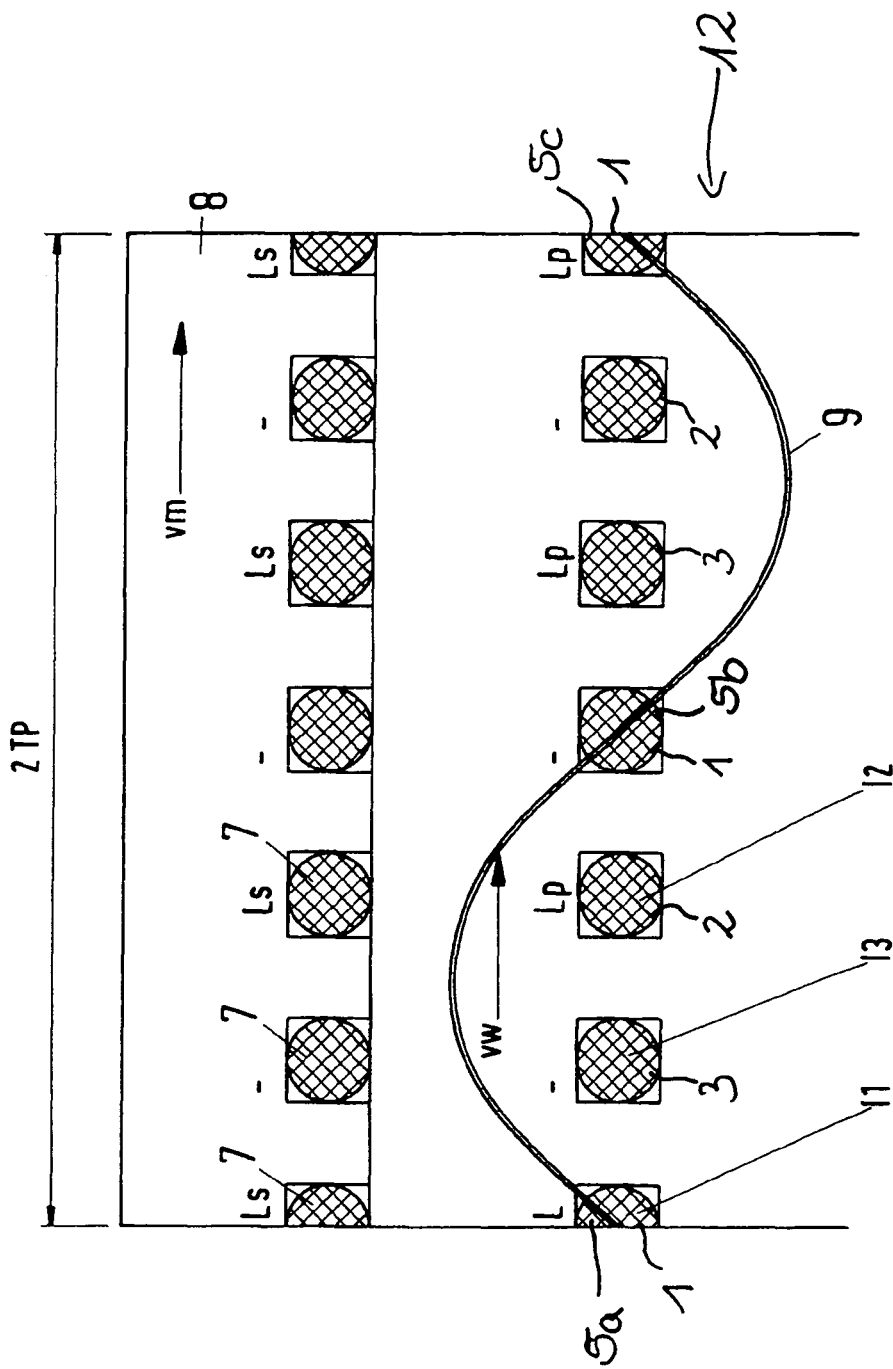

FIG. 5 shows another cut along a cutting plane which extends vertically and which extends in the travel direction. The wires or bundles of wires of lines 1, 3, 2 which are located in sections of the lines 1, 3, 2 which extend transversely to the direction of travel are shown in the upper half of FIG. 5. In total, seven sections of the arrangement 12 which extend transversely to the travel direction are shown in FIG. 5, at least partially. The first, fourth and seventh section in the row (from left to right) belong to line 1. Since the direction of the current I1 through section 5b (the fourth section in FIG. 5) is opposite to the direction of the current I1 through the sections 5a, 5c (the first and the seventh section in FIG. 5), and since the currents I1, I3, I2 are alternating currents, the produced electromagnetic wave is moving in the direction of travel at a speed vw. The wave is denoted by 9, the inductivity of the arrangement 12 by Lp.

The cross sections shown in the upper half of FIG. 5 represent a receiving device of a vehicle which is travelling in the direction of travel and at a speed vm and at the top of FIG. 5 "2 TP" indicates that FIG. 5 shows a line segment of arrangement 12, the length of which is equal to twice the distance between three consecutive transversely extending sections of a line, here line 1.

The arrangement shown in FIG. 6 comprises a conductor arrangement 103, 104, 105, which may be the conductor arrangement 12 according to FIG. 1. In order to show their electric properties, equivalent circuit symbols are used in FIG. 6. The three-phase system 103, 104, 105 carries phase currents I1, I2, I3 in phases 1, 2, 3. The inherent inductivities of the phases 1, 2, 3 are denoted by Lp1, Lp2, Lp3 which produce the electromagnetic field for transferring energy to any vehicle on the track. However, the lines 1, 2, 3 also comprise leakage inductivities Ls1, Ls2, Ls3, as indicated in block 104 in FIG. 6. The impedance of these undesired leakage inductivities is compensated by capacities Ck1, Ck2, Ck3 in the lines 1, 2, 3 as shown in block 103.

The electric energy which is used to produce the electromagnetic fields in lines 1, 2, 3 is generated by a three-phase voltage source 101. The phase sources for the phases are denoted by V1, V2, V3 in block 101. The produced voltages in the lines 1, 2, 3 are denoted by U1, U2, U3. The voltage source is connected to the input of a constant-current source 102. An output of this source 102 is connected to the capacities in block 103. At the output of source 102 the currents I1, I2, I3 are generated. These currents are constant over time, independently of the energy which is transferred from lines 1, 2, 3 to any vehicle on the track. At the input side of constant current source 102, the source 102 comprises in each line 1, 2, 3 an input inductivity L1a, L2a, L3a. At the output side of the source 102, each line 1, 2, 3 comprises an output inductivity L1b, L2b, L3b. In between the input and output inductivities, each line 1, 2, 3 is connected to a common star point 61 via a capacity C1, C2, C3.

Figure 7:
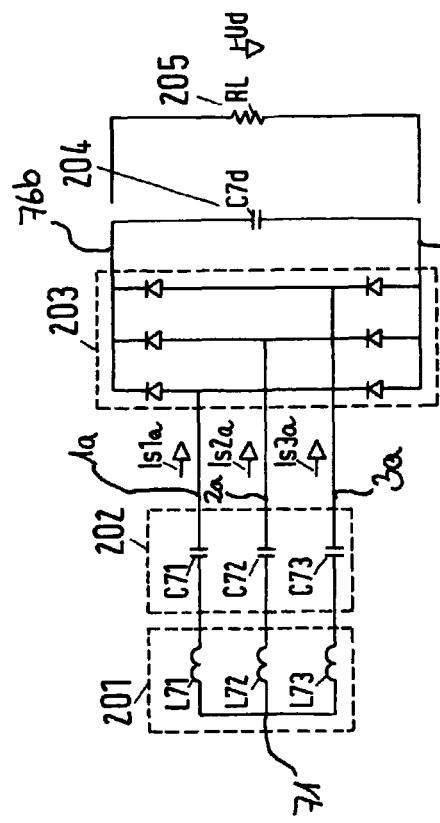

FIG. 7 shows a circuit diagram of an arrangement which may be located in a vehicle which is travelling on the track. The arrangement comprises a three-phase receiving device for receiving the electromagnetic field from the track and for producing electric energy therefrom. The receiving device comprises one coil or an arrangement of coils for each phase 1a, 2a, 3a, wherein the coils are denoted by L71, L72, L73 (block 201). In the embodiment shown, the phases 1a, 2a, 3a are connected together at a common star point 71. Leakage inductivities (not separately shown in FIG. 7) of the phases 1a, 2a, 3a are compensated by capacities C71, C72, C73, as shown in block 202.

The output side of the receiving device 201, 202, where the phase currents Is1a, Is2a, Is3a are shown in FIG. 7 is connected to an AC/DC (alternating current/direct current) converter 203. The DC-side of the converter 203 is connected to lines 76a, 76b of an intermediate circuit. The lines 76a, 76b are connected to each other via a smoothing capacity C7d as indicated by "204". The electric load, which may be provided with energy within the vehicle is denoted by a resistance RL at "205" which may be connected to the lines 76a, 76b of the intermediate circuit. "Ud" indicates that the load RL may cause a voltage drop, wherein Ud is the voltage in the intermediate circuit for example.

Figure 8:
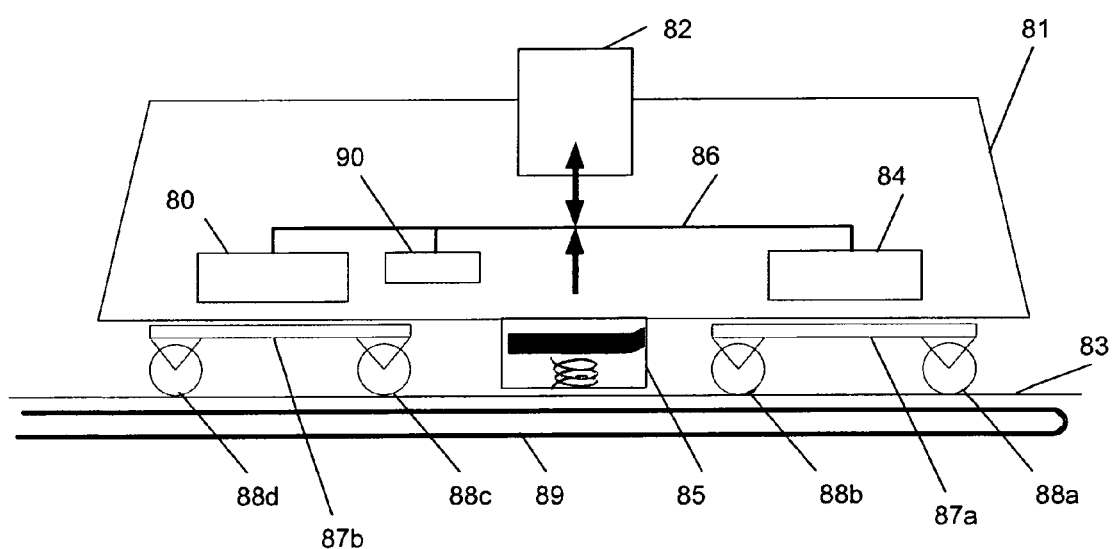

FIG. 8 shows a track 83 (here: a railway track having two rails) which is occupied by a track bound vehicle 81, such as a regional public transport train or a tram.

The arrangement shown comprises an electric conductor arrangement for producing an electromagnetic field, thereby transferring energy to the vehicle on the track. The conductor arrangement 89 is shown schematically. For example, the conductor arrangement may be designed as shown in FIG. 1. The conductor arrangement 89 (and this applies to other arrangements, not only to the example shown in FIG. 8) may be located underground or above ground. In particular in the case of railways having two rails on which wheels of rail vehicles may roll, the conductor arrangement may be located above ground between the rails on the level of a railway sleeper, or partly above ground, but under the railway sleepers. If the railway sleepers are made of concrete for example, the sleepers or the other construction for holding the rails may comprise holes and/or cavities, through which the line or lines of the conductor arrangement extends. Thereby, the railway construction may be used to hold the line(s) in the desired serpentine shape.

The track bound vehicle 81 comprises at its underside a receiving device 85 for receiving the electromagnetic field which is produced by the conductor arrangement 89. The receiving device 85 is electrically connected to an on-board electric network 86 so that the electric energy, which is induced in the receiving device 85 may be distributed within the vehicle 81. For example, auxiliary devices 90 and propulsion units 80, 84 for driving propulsion motors (not shown) in bogies 780a, 780b having wheels 88a, 88b, 88c, 88d may be connected to the distribution network 86. Furthermore, an energy storage 82, such as an electrochemical energy storage or an arrangement of capacitors, such as super caps, may also be connected to the distribution network. Therefore, the energy storage 82 may be charged by the energy received by the receiving device, in particular during stops of the vehicle 81 on the track. When the vehicle 81 is moving on the track, a part of the propulsion energy which is needed to move the vehicle 81 may be withdrawn from the energy storage 82 and at the same time the energy, which is received by the receiving device may contribute to the propulsion, i.e. may be part of the propulsion energy.

Figure 9:
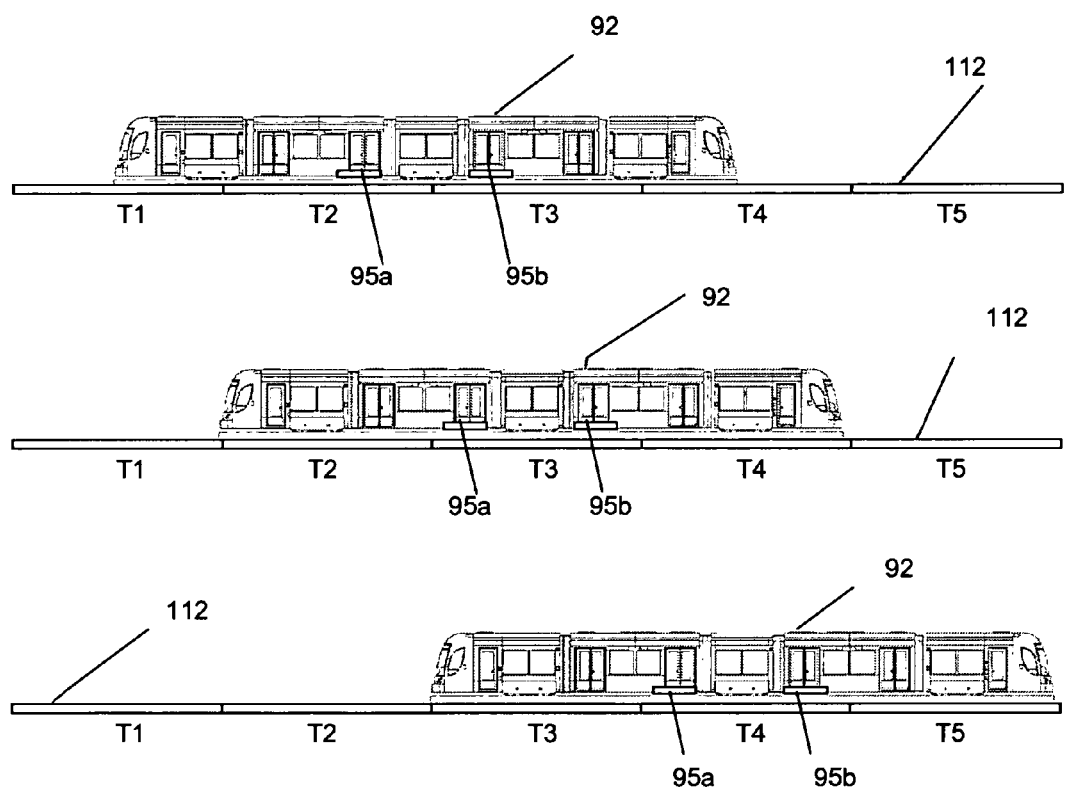

FIG. 9 illustrates the concept of a conductor arrangement 112 comprising sections which can be switched on and off so that only sections, which are switched on produce an electromagnetic field in order to transfer energy to the vehicle or vehicles on the track. The example of FIG. 9 shows 5 segments T1, T2, T3, T4, T5 which are arranged in a row of successive segments along the track.

A vehicle 92, such as a tram, is travelling on the track. Under floor of the vehicle 92 two receiving devices 95a, 95b for receiving electromagnetic field produced by the segments are provided. The receiving devices 95a, 95b may be redundant devices, wherein just one of the devices is necessary for operating the vehicle. This increases operation safety. However, the devices 95a, 95b may also be non-redundant devices which may produce energy at the same time for operating the vehicle. However, it may happen in this case, that at least one of the devices 95 may not produce electric energy. Instead of two receiving devices, the vehicle may comprise more receiving devices.

The following description relates to all these cases and, in addition, to the case that the vehicle has just one receiving device.

According to the example shown in FIG. 9, the vehicle is moving from the left to the right. In the upper part of FIG. 9, the vehicle 92 occupies the track above elements T2, T3 and partly occupies the track above elements T1 and T4. The receiving devices 95 or the receiving device are located always above elements which are fully occupied by the vehicle. This is the case, because the distance between the receiving devices to the nearest end of the vehicle in lengthwise direction is greater than the length of each segment of the conductor arrangement 112.

In the situation of the top view of FIG. 9, the elements T2, T3 are switched on and all other elements T1, T4, T5 are switched off. In the middle view of FIG. 9, where the vehicle 92 fully occupies the track above elements T2, T3 and nearly fully occupies the track above element T4, element T2 has been switched off, because the receiving devices 95 or the receiving devices have/has already left the region above element T2, and element T4 will be switched on as soon as the vehicle fully occupies the region above the element T4. This state, when the element T4 is switched on is shown in the bottom view of FIG. 9. However, in the meantime element T3 has been switched off.

Figure 10:
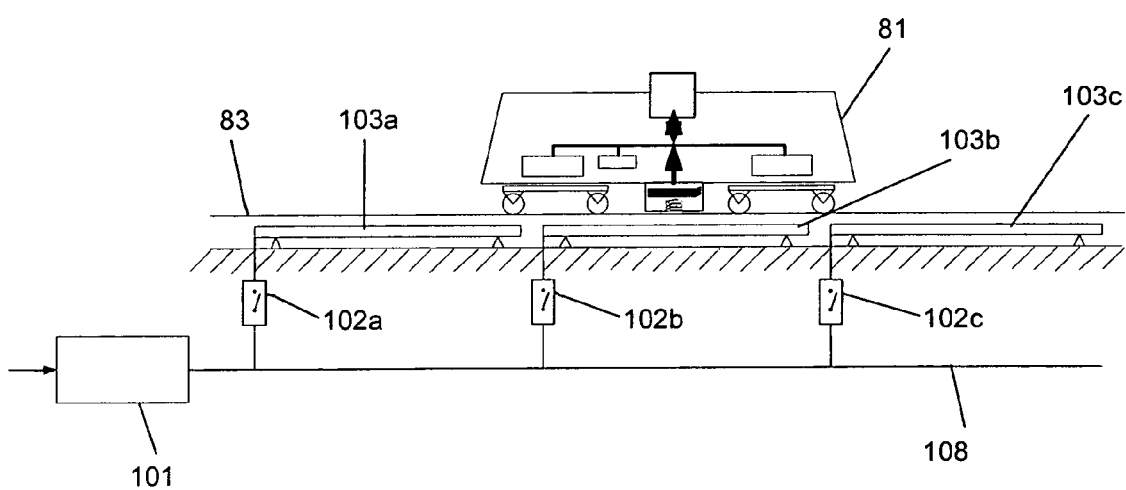

FIG. 10 shows an arrangement which is similar to the arrangement shown in FIG. 9. In fact, it may be a different view of the same arrangement as shown in FIG. 9. However, FIG. 10 shows additional parts of the arrangement. Each of the successive segments 103a, 103b, 103c of the conductor arrangement for producing an electromagnetic field is connected via a separate switch 102a, 102b, 102c for switching on and off the element 103, to a mainline 108. In the case of a three-phase alternating current system, the mainline 108 may comprise wires or cables for each phase. The far end of the mainline 108 (at the right hand side of FIG. 10, but not shown) may comprise a common star point of all three-phases. On the opposite site of the mainline 108, it is connected to an energy source 101, such as the arrangement according to blocks 101, 102 as shown in FIG. 6.

The invention claimed is:

1. A system for transferring electric energy to a track bound vehicle, comprising:
    an electric conductor arrangement for producing an alternating electromagnetic field and for thereby transferring the energy to the vehicle, wherein
    the electric conductor arrangement comprises a plurality of lines for carrying in each case one phase of an alternating electric current,
    the lines extending along the track, wherein
    each line is arranged in such a manner that the line produces, at each point in time while the alternating electric current is flowing through the line, a row of successive magnetic poles of an electromagnetic field, wherein the successive magnetic poles have alternating magnetic polarities,
    the row of successive magnetic poles extending in the travel direction of the vehicle which is defined by the track,
    wherein each line is adapted to carry one phase of a multiphase alternating voltage or current, wherein the magnetic poles produced by the lines are, at each point in time, in a repeating sequence extending in the travel direction, wherein the repeating sequence corresponds to a sequence of the phases,
    the lines are connected to a constant-current source which is adapted to feed the lines with an alternating current having a constant mean value independently of the power which is transferred from the electric conductor arrangement to the vehicle or vehicles on the track, and
    the constant-current source comprises an arrangement for transforming an alternating voltage of an energy source into an alternating current, the arrangement comprising, in each line, an input inductivity at an input side of the constant-current source and an output inductivity at an output side of the constant-current source, wherein the input side is connected to an energy source, wherein the output side is connected to line sections along the track, wherein each line comprises a connection point between the input side and the output side and wherein each connection point is connected to a common same star point via a capacity.

2. The system of claim 1, wherein the lines comprise a plurality of line segments, wherein each line segment extends along a different section of the track and can be switched on and off independently of the other line segments.

3. The system of claim 2, wherein the line segments are shorter than the length of a vehicle on the track in the travel direction and wherein the system is adapted to switch on line segments only if a vehicle is occupying the respective section of the track where the line segment is located.

4. A system for transferring electric energy to a track bound vehicle, comprising:
    an electric conductor arrangement, wherein
    the electric conductor arrangement comprises a plurality of lines for carrying in each case one phase of an alternating current,
    the lines extending along the track, wherein
    each line comprises a plurality of sections which extend transversely to the travel direction of the vehicle which is defined by the track, wherein
    the sections of the same line are arranged in a row along the track in such a manner that, at each point in time while an alternating electric current is flowing through the line, the alternating current flows through successive sections in the row alternatingly in opposite directions,
    wherein each line is adapted to carry one phase of a multiphase alternating voltage or current, wherein the sections of the different lines are in a repeating sequence extending in the travel direction, wherein the repeating sequence corresponds to a sequence of the phases,
    the lines are connected to a constant-current source which is adapted to feed the lines with an alternating current having a constant mean value independently of the power which is transferred from the electric conductor arrangement to the vehicle or vehicles on the track, and
    the constant-current source comprises an arrangement for transforming an alternating voltage of an energy source into an alternating current, the arrangement comprising, in each line, an input inductivity at an input side of the constant-current source and an output inductivity at an output side of the constant-current source, wherein the input side is connected to an energy source, wherein the output side is connected to line sections along the track, wherein each line comprises a connection point between the input side and the output side and wherein each connection point is connected to a common same star point via a capacity.

5. The system of claim 4, wherein at least some of the sections extend in the direction transverse to the travel direction over a width which is greater than the width of a receiving device of a vehicle on the track for receiving the transferred energy.

6. The system of claim 4, wherein the lines comprise a plurality of line segments, wherein each line segment extends along a different section of the track and can be switched on and off independently of the other line segments.

7. The system of claim 6, wherein the line segments are shorter than the length of a vehicle on the track in the travel direction and wherein the system is adapted to switch on line segments only if a vehicle is occupying the respective section of the track where the line segment is located.

8. A method for transferring electric energy to a track bound vehicle, comprising:
producing an electromagnetic field by an electric conductor arrangement located along the track thereby transferring the electric energy to the vehicle, wherein
the electromagnetic field is produced by conducting a plurality of phases of an alternating current in a plurality of lines of the electric conductor arrangement,
the phase currents are conducted along the track in the lines in such a manner that, at each point in time while the alternating electric current is flowing through the respective line, a row of successive magnetic poles of an electromagnetic field is produced, wherein the successive magnetic poles have alternating magnetic polarities, and
the row of successive magnetic poles extends in the travel direction of the vehicle which is defined by the track,
wherein the magnetic poles produced by the lines are, at each point in time, in a repeating sequence extending in the travel direction, wherein the repeating sequence corresponds to a sequence of the phases,
the lines are provided with an electric current by a constant-current source which is adapted to feed the lines with an alternating current having a constant mean value independently of the power which is transferred from the electric conductor arrangement to the vehicle or vehicles on the track, and
the constant-current source transforms an alternating voltage of an energy source into an alternating current using, in each line, an input inductivity at an input side of the constant-current source and an output inductivity at an output side of the constant-current source, wherein the input side is connected to an energy source, wherein the output side is connected to line sections along the track, wherein each line comprises a connection point between the input side and the output side and wherein each connection point is connected to a common same star point via a capacity.

9. The method of claim 8, wherein the lines comprise a plurality of line segments, wherein each line segment extends along a different section of the track and wherein the line segments are switched on and off independently of the other line segments, so that vehicles on occupied sections of the track are provided with energy and so that line segments along at least some sections of the track, which are not occupied by a vehicle, are switched off.

10. The method of claim 9, wherein the sections of the track are shorter than the length of a vehicle on the track in the travel direction and wherein line segments are switched on only if a vehicle is occupying the respective section of the track where the line segment is located.

11. The method of claim 10, wherein the occupation of a respective section of the track by a vehicle is detected by detecting a voltage and/or a current in the line segment which is caused by inductive coupling of the vehicle to the line segment and/or which is caused by electromagnetic fields produced by the vehicle.

12. The method of claim 9, wherein a line segment is switched on before a receiving device of a vehicle for receiving the transferred energy enters the section of the track where the line segment is located.

13. A method for transferring energy to a vehicle, comprising
producing an electromagnetic field by an electric conductor arrangement located along the track thereby transferring the energy to the vehicle, wherein
the electromagnetic field is produced by conducting a plurality of phases of an alternating current in a plurality of lines of the electric conductor arrangement,
the phase currents are conducted along the track in the line in such a manner that, at each point in time while the phase current is flowing through the respective line, the phase current flows transversely to the travel direction of the vehicle through a plurality of sections of the line, wherein the phase current flows through a first group of the sections in a first direction and the phase current flows through a second group of the sections in the opposite direction and wherein the sections of the first group and of the second group alternate in the direction of travel,
wherein the sections of the different lines are in a repeating sequence extending in the travel direction, wherein the repeating sequence corresponds to a sequence of the phases,
the lines are provided with an electric current by a constant-current source which is adapted to feed the lines with an alternating current having a constant mean value independently of the power which is transferred from the electric conductor arrangement to the vehicle or vehicles on the track, and
the constant-current source transforms an alternating voltage of an energy source into an alternating current using, in each line, an input inductivity at an input side of the constant-current source and an output inductivity at an output side of the constant-current source, wherein the input side is connected to an energy source, wherein the output side is connected to line sections along the track, wherein each line comprises a connection point between the input side and the output side and wherein each connection point is connected to a common same star point via a capacity.

14. The method of claim 13, wherein the lines comprise a plurality of line segments, wherein each line segment extends along a different section of the track and wherein the line segments are switched on and off independently of the other line segments, so that vehicles on occupied sections of the track are provided with energy and so that line segments along at least some sections of the track, which are not occupied by a vehicle, are switched off.

15. The method of claim 14, wherein the sections of the track are shorter than the length of a vehicle on the track in the travel direction and wherein line segments are switched on only if a vehicle is occupying the respective section of the track where the line segment is located.

16. The method of claim 15, wherein the occupation of a respective section of the track by a vehicle is detected by detecting a voltage and/or a current in the line segment which is caused by inductive coupling of the vehicle to the line segment and/or which is caused by electromagnetic fields produced by the vehicle.

17. The method of claim 14, wherein a line segment is switched on before a receiving device of a vehicle for receiving the transferred energy enters the section of the track where the line segment is located.

* * * * *

UNITED STATES PATENT AND TRADEMARK OFFICE
CERTIFICATE OF CORRECTION

PATENT NO.        : 8,590,682 B2
APPLICATION NO. : 13/001837
DATED             : November 26, 2013
INVENTOR(S)       : Meins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 347 days.

Signed and Sealed this
Twenty-second Day of September, 2015

Michelle K. Lee
*Director of the United States Patent and Trademark Office*